Patented July 3, 1928.

1,675,977

UNITED STATES PATENT OFFICE.

SATOYASU IYMORI AND KOJI SUZUKI, OF TOKYO, JAPAN, ASSIGNORS TO ZAIDAN HOJIN RIKAGAKU KENKYUJO, OF TOKYO, JAPAN.

PROCESS OF MAKING SOLVENT OIL.

No Drawing. Application filed August 4, 1923, Serial No. 655,761, and in Japan November 1, 1922.

This invention relates to a process of producing an oil chiefly suitable as an organic solvent, and consists in that the resins from coniferous woods, colophonium or liquids obtained from resins by dry distillation, are mixed with one or more of absorbent materials such as acid earth, fuller's earth, kieselguhr, alumina, kaolin, pumice or coke, and heated until they are decomposed. The object of this invention is to easily obtain an oil which is chiefly suitable as an organic solvent and also as a liquid fuel, or for obtaining raw material for liquid perfume by cracking such special materials by the chemical and catalytic action of the absorbent materials.

In the present invention, the resins of coniferous woods, the residue of the resins on the distillation of oil of turpentine, for example, colophonium, or the liquids produced by the dry distillation of the said resins are employed as the raw materials, and an oil which is suitable as an organic solvent and also as a substitute for liquid fuel such as gasoline can be produced according to the process as hereafter described.

The raw materials as above set forth are mixed with acid earth, fuller's earth, kieselguhr, alumina, kaolin or a special porous solid matter such as pumice or coke, and is put in an iron retort and heated to 500° C. or thereabout. Then the resin acid, which is the principal constituent of the raw materials, and its decomposition products are further decomposed into various aromatic hydrocarbons, hydroaromatic hydrocarbons, unsaturated hydrocarbons and their oxidized products such as aromatic alcohols. These distillation products are then fractionally distilled, and firstly a fraction obtainable at a temperature between 200° and 350° C. is separated. This step of the distillation may be conveniently named as the first step. In the second step, the remaining part is added to the acid earth or other catalysts above enumerated and subjected again to destructive distillation in the iron still at a temperature of 500° C. or thereabout. When the distilled portion is again fractionated, the large portion thereof can be distilled out at a temperature of substantially 225° C., and this portion is the product sought in the present invention. It is a colourless liquid having a nearly constant boiling point of about 230° C. as above stated and its specific gravity is 0.88. From the fact that two-thirds of it are absorbed by concentrated sulphuric acid, it is presumed to be an unsaturated compound, or a hydroaromatic compound. It readily dissolves rubber, pitch, paraffin, sulphur and the like, and can be used as an excellent solvent. It is also used for making a raw material for liquid perfume and also as a liquid fuel in place of gasoline and the like.

For example, when using acid earth, resins, colophonium of the fractionated oils, that is, the raw materials are mixed with equal part of the earth in both the first and second step. When such mixture is treated in the order as above described, the yield of the desired oil is about 20% of the raw materials.

It is noted here that the starting carbonaceous materials employed in this invention are quite different from fish oils, soya-bean oil, rape oil and the like which are used in the known process of producing an oil by heating them with the addition of acid earth. While fish oils are esters of aliphatic acids and so, too, are the vegetable oils, viz, both belonging chemically to the same group, and being glycerides,—the raw materials in the present application are cyclic organic acids or their anhydrides. Therefore the latter materials differ from the former not only in their sources, but in chemical sense. Thus, is is evident that the present invention is novel in the raw material employed.

We claim:

1. In a process of producing an oil suitable as an organic solvent from resinous materials present in coniferous woods, the steps consisting in mixing such material with an acid earth and heating the mixture at about 500° C. until decomposition occurs.

2. In a process of producing an oil suitable as an organic solvent from resinous materials present in coniferous woods, the steps consisting in mixing such material with acidic fuller's earth and heating the mixture at about 500° C. until decomposition occurs.

In testimony whereof they affix their signatures.

SATOYASU IYMORI.
KOJI SUZUKI.